May 16, 1933. T. ROBINSON 1,909,318
METHOD OF MAKING PREPARED BUILDING PRODUCTS
Original Filed June 19, 1928  2 Sheets-Sheet 1
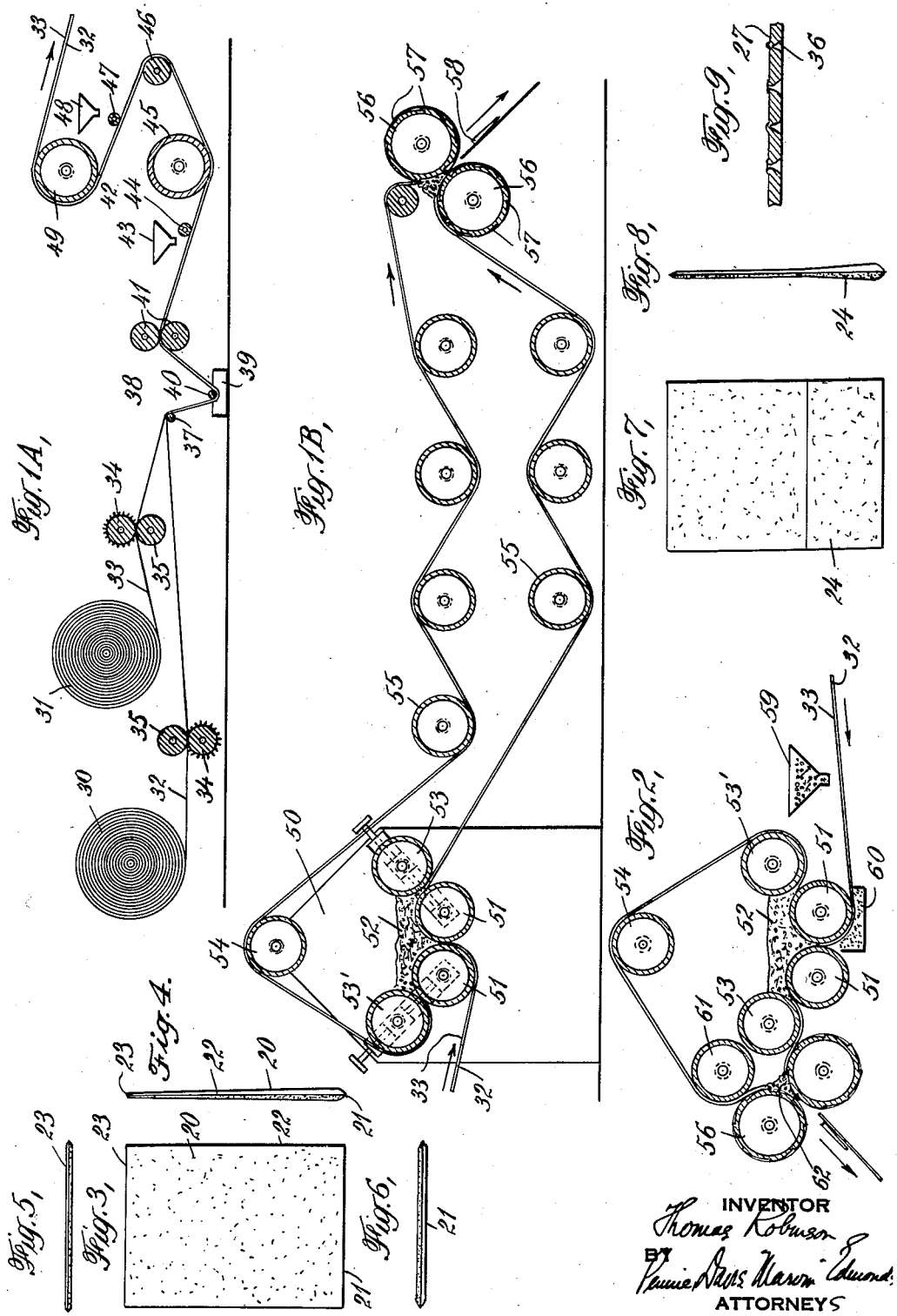
INVENTOR
Thomas Robinson
BY
ATTORNEYS

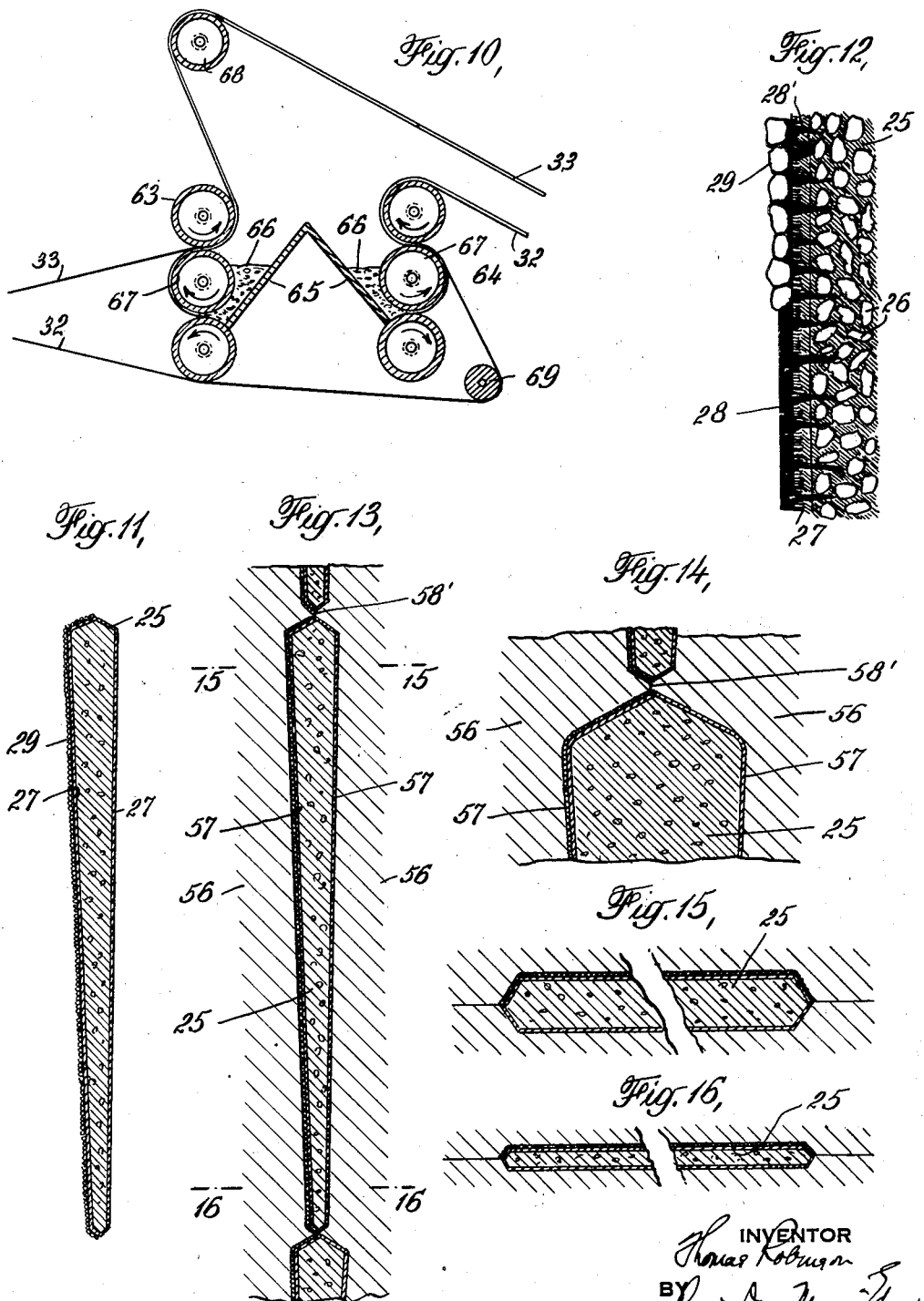

Patented May 16, 1933

1,909,318

UNITED STATES PATENT OFFICE

THOMAS ROBINSON, OF NEW YORK, N. Y., ASSIGNOR TO LANCASTER ASPHALT, INC., OF NEW YORK, N. Y., A CORPORATION OF DELAWARE

METHOD OF MAKING PREPARED BUILDING PRODUCTS

Original application filed June 19, 1928, Serial No. 286,502. Divided and this application filed July 16, 1929. Serial No. 378,689.

This invention relates to building products capable of withstanding exposure to the elements and providing a water-proof surface, such that these products may be employed for roofing, siding, and other similar purposes. More particularly the invention is concerned with a method for producing the new product set forth and described in my co-pending application, Serial No. 286,502, filed June 19, 1928, of which the present application is a division.

The product set forth in the co-pending application is to a large extent made up of a mastic material which is more or less fluent when heated and hardens on cooling, this mastic giving the element the desired body and strength. The material also includes a pair of facing or jacket sheets applied to opposite faces of the mastic mass to give it a finished appearance and also to add to its strength and rigidity.

The method of this invention is one by which the new product may be produced rapidly, at low cost, and with a high percentage of the output of first quality. This method is suitable for production of the new material in various shapes and forms suitable for different uses. As the new product is of particular utility and affords important advantages when used as a roofing, a form of the method will be described appropriate for the manufacture of roofing material.

Prepared roofing now widely used in place of slate, wood shingles and the like, has numerous advantages and some disadvantages. It is cheaper than wood shingles, more resistant to fire and of at least equal durability, but one of the usual components of such roofing is rag felt which is relatively expensive. This felt forms the basis of the material and it is customarily saturated and coated with bituminous substances such as asphalt and then given a wear surface of crushed slate, etc. As the felt, even in the heaviest and most expensive grades is relatively thin, a roofing element with a felt base is likewise thin and the exposed butt does not cast any considerable shadow so that the appearance of a roof laid with these elements is less attractive than that of a wood shingle or tile roof. Furthermore, the felt which represents the greatest item of expense in the manufacture of this roofing is itself the least durable part and in the course of time, the felt deteriorates and rots due to exposure to the weather, the edges of the elements warp and curl making them unsightly and sometimes causing leaks and in the course of time, the felt disintegrates.

The present invention is accordingly directed to the provision of a method by which the novel roofing material of the application above identified may be made at lower cost than prepared roofing employing felt as a foundation member or base, this method being suitable for production of the material in different shapes and sizes, and in particular in the form of thick butt shingles.

The mastic which I prefer to use to form the core or base of the new product is a mixture in suitable proportions of a bituminous compound, such as asphalt, and granular material or grit, such as crushed rock, crushed slate, sand and other similar substances. In some instances it may be desirable to use infusorial earth, ground cork, fibrous asbestos and the like in addition to or in substitution for the granular material to produce articles of different weights and other characteristics. This mastic material forms a core which is enclosed wholly or in part by fibrous sheets, preferably rag felt, which is not saturated or impregnated except as an incident to other operations. These sheets form a jacket for the core, adding to its strength and durability, defining its shape and carrying gritty wear material affixed thereto by a suitable adhesive such as an asphalt coating.

The method of this invention for the production of the new material involves drawing a web of unsaturated felt from a supply, and applying to one surface a coating of asphalt or the like. In the ordinary roofing process, such felt is saturated with a low melt point asphalt before any other operation is performed on it, and after this, the felt is cooled and a coating of asphalt of a higher melt point than the saturant in which the wear surface is to be embedded is applied. In the new process, however, the unsaturated felt receives the coating of asphalt at once, then the wear surface is applied, and this coating material is put on in a condition such that it enters into the pores of the felt to a substantial distance. The felt used is relatively very thin so that this seeping in of the coating may readily extend partly through the felt without difficulty.

After the coating operation, a layer of mastic in more or less fluent condition is applied to the desired thickness on the face of the felt opposite to that coated. This layer of mastic is of substantial thickness but is applied in such condition that the asphaltic component may enter into the felt. By properly controlling the application of coating and mastic and the fluidity thereof, it is possible to insure that the coating compound and the plastic ingredient of the mastic, which are the same and preferably asphalt of the same melting point will extend entirely through the felt and unite to produce substantially complete saturation. After the sheet has received its mastic facing, it is cooled so that the mastic receives an initial set. Then a pair of such sheets are placed together with their mastic coatings between, and shaping and cutting operations are performed to unite the sheets into a single element of the desired form and size. In the finished product, the mastic forms the base, and upon each face is a layer of felted fibres. Through this layer extends the asphaltic compound in a substantially continuous mass from the core to the outer layer carrying the wear surface. The felted sheets forming the jacket are thus sufficiently impregnated and saturated and this result is obtained without performing a separate operation for the purpose.

The method of the present invention includes numerous features of novelty in addition to these briefly referred to.

For a better understanding of the invention, reference may be had to the accompanying drawings, in which Figs. 1A and 1B together illustrate somewhat conventionally the layout in side elevation of the apparatus for producing the new elements;

Fig. 2 is a view in side elevation of modified apparatus for the same purpose;

Figs. 3 and 4 are views in plan and side elevation, respectively, of one of the new elements in the form of a shingle;

Figs. 5 and 6 are views of the thin and butt ends, respectively, of the new element;

Figs. 7 and 8 are plan and side views, respectively, of a modified form of the element;

Fig. 9 is a detail of the apparatus;

Fig. 10 is a view in side elevation of a part of a modified form of the apparatus;

Fig. 11 is a sectional view of a new element;

Fig. 12 is a sectional view illustrating the manner in which the felt is impregnated;

Fig. 13 is a sectional development view of a part of the shaping apparatus;

Fig. 14 is a sectional view of a part of the apparatus shown in Fig. 13; and

Figs. 15 and 16 are sectional views on the lines 15—15 and 16—16, respectively, of Fig. 13.

In these drawings, the element 20 is illustrated in Figs. 3–6, inclusive, in a form appropriate for use as a shingle. This element is rectangular but its width may lessen toward the thick or butt end 21. The element also tapers in thickness from the rear edge 23 which is the end normally concealed toward the butt or exposed end 21. In a modified form shown in Figs. 7 and 8, the element is of substantially uniform width and thickness from the rear end forward to an imaginary transverse line defining the normal exposure, forward of which the element increases in thickness as indicated at 24, and may decrease in width. The elements are placed on the roof in the usual courses and each element lies with its side edges at the rear end in contact with the side edges of an adjacent element or slightly spaced therefrom.

Each element comprises a mastic core or base 25 (Figs. 11, 12) which is made up of a mixture of ingredients previously mentioned. The mastic illustrated by way of example preferably includes particles of grit 26, termed a mineral aggregate, fibrous material, and a binder or vehicle, preferably asphalt of a suitable melting point. This mastic forms the core or body of the element, and covering each face and also preferably the end and side edges is a jacket of felted fibres 27 firmly adherent to the core and provided with a coating 28 of asphalt or the like, in which are partially submerged or embedded particles 29 constituting a wear surface. Crushed slate is an example of the granular material frequently used for such a surface, and this may also be used for the aggregate in the mastic, though there are other mineral materials equally suitable and somewhat cheaper such as crushed rock, or sand.

The jacket 27 is preferably made in two pieces, the edges of which may meet without substantial overlap in the median plane of the element. By making the jacket in two pieces, the edges of which meet without substantial overlap, it is possible to produce these elements by a continuous process using certain rotary elements which perform operations without interrupting the progress of the materials, and at the same time apply the jacket so that it covers both faces and all edges of the core and completely encloses it.

The jacket material employed may be of different materials, such as paper of relatively heavy weight, but I prefer to use a light felt produced of rags and similar materials on a paper machine, such felt consisting of felted fibres which provide a porous and absorbent layer. The felt used however is not comparable in thickness or weight with felts used for standard roofing purposes, but is quite thin, and may vary in weight from 10 to 26 pounds to the unit of 480 square feet, while standard roofing felt varies in weight from 20 to 60 pounds for the same unit. The jacket felt is thus very thin and porous, readily shaped and easily impregnated.

The new element is made by a process which may be said to involve the application of a coating of asphalt and wear material to one face of a web of this thin felt, the asphalt being applied at a temperature and in amounts such that the asphalt is fluent enough to enter the pores of the felt to a substantial depth. After the wear surface has been applied over this coating, a layer of mastic containing asphalt of the same melt point as that used in the coating is applied on the opposite face of the felt to form a layer of considerable thickness. The mastic is applied at a temperature such that the asphalt therein is relatively fluent and enters the pores of the felt to a depth such that it substantially completes the impregnation thereof, and unites with the asphalt from the coating so that the felt coated on both sides may be described as made up of a mastic body with an asphalt coating carrying granular wear material with a thin layer of felted fibres interposed between the mass of mastic and the coating layer. Following the application of the mastic, the felt is sufficiently impregnated and saturated and firmly bound thereto.

To complete the element, two webs of felt treated as above described are brought into juxtaposition with the mastic layers in contact, then compression is applied to unite the mastic bodies into a single core and to shape the core and jacket, and simultaneously with the shaping operation, the felt webs are severed around the outlines of the formed core to complete the product. In the shaping operation, the jacket sheets are forced into contact at the edges of the shaped core, and severed along the line of contact. This produces a completely jacketed core, without substantial overlap of the jackets, and permits the shaping and severing operations to be carried on by rotary molding and cutting rolls, which produce a completely enclosed core.

This process may be carried on with various forms of apparatus, that shown in Figs. 1A and 1B being convenient and inexpensive. In these figures there are illustrated the two webs of jacket material 30 and 31, mounted on suitable supports so that the webs may be drawn from them without difficulty. Each web 32, 33 passes from its roll through a pair of rolls 34, 35, each roll 34 being provided with a multiplicity of fine spikes, while the corresponding roll 35 has a more or less yielding surface of rubber, leather or wood. The felt passing between these rolls is punctured at a multiplicity of points and each spike 36 (Fig. 9) is so shaped that as it passes through the felt, it roughens the surface beyond which the spike projects. The rolls 34, 35 are so placed that the face of the felt so roughened is the face to which the mastic is applied. The projecting or roughened parts of the felt then enter the mastic layer and increase the strength of the bond between the mastic and felt. Also the openings in the felt assist in the saturation of the felt and permit solid tongues 28' of asphalt to extend directly therethrough to meet and unite with the asphalt coating layer.

Beyond the perforating devices, the two webs of felt are brought together and pass around a guide roll 37 forming part of a coating mechanism generally designated 38. Standard apparatus well known in the art may be used for this purpose. As illustrated diagrammatically, the two webs of felt, face to face, are led through a vat 39 of coating material beneath a guide roll 40, and a coating material applied to the outer faces and edges. From the vat, the webs pass through rolls 41, which remove excess coating material. The coating material which is preferably asphalt of a melt point sufficient to withstand solar heat is maintained at a suitable temperature in the vat, so that the asphalt will flow readily and thus enter the pores of the felt to a substantial depth.

From the coater, the webs pass to mechanism generally designated 42, for applying wear material to the coatings. The details of such mechanism are well known, though these details have here been modified and utilized in a way so that surfacing material is applied to opposite faces of the double web. The two webs pass beneath a hopper 43 beneath which is a distributing roll 44, and a layer of the surface grit is spread evenly over the upper surface of the web 33, this grit being partially submerged or embedded in the coating by the roll 45 under which the webs pass. This roll may be hollow and water-cooled so that it gives the coating an initial set at the same time the grit is embedded. The webs now pass around a guide roll 46, so that the web 32 is uppermost and grit is applied to it by the distributing roll 47 receiving grit from the hopper 48. The webs now pass around roll 49 similar to the roll 45, which embeds the grit and sets the coating. The webs then pass to the mechanism for applying the mastic.

This mechanism generally designated 50 includes a pair of rolls 51, 51 placed with their surfaces close together, and the webs 32, 33 pass upwardly between these rolls and are then separated. A supply of the mastic 52 is maintained in the bight of the rolls and kept in place by suitable end plates, not shown. As the webs separate and pass one around each roll 51, the uncoated faces of the webs come in contact with the relatively fluent mastic and pick up a layer thereof. Placed to one side and above each roll 57, is a roll 53, 53' journalled in bearings which are adjustable with respect to the bearings for the rolls 51 so that the distance between the surfaces of roll 51 and roll 53, 53' may be varied. Each web is led around the surface of a roll 51, picking up a coating of mastic, then between the roll 51 and its associated roll 53 or 53'. The distance between the surface of roll 51 and roll 53, for example, determines the thickness of the layer of mastic carried off by the web 32, excess mastic being returned to the supply 52. The web 33 passes over its roll 51, then between that roll and roll 53', whereby the thickness of the mastic layer is determined, then around that roll to an upper guide roll 54.

The various rolls 51, 53, 53' and 54 are hollow and arranged so that they may be heated or cooled as may be necessary, and the supply of mastic 52 is kept at a temperature such that the asphaltic ingredient is sufficiently fluent so that it will penetrate the roughened surface of the felt and add to the saturation thereof. Also such of these and other rolls in the apparatus as may be necessary, are driven to cause the felt to advance from its supply through the machine. As the coating asphalt and that in the mastic are preferably the same, they unite in the felt so that there is a substantially continuous asphaltic mass extending through the felted fibres from one face to the other.

From the mastic applying mechanism, the two webs of felt are moved to cooling devices, taking the form of rolls 55, around which the two webs are led in a tortuous path. These rolls may be water-cooled so that the coating and the mastic will set partially. These rolls are used to the number desired or necessary to put the coated webs in suitable condition to be combined into building products.

The mechanism used for this purpose is similar to that set forth and described in my co-pending application Serial No. 139,612, filed October 5, 1926. That mechanism includes a pair of rotary drums 56, having mold cavities 57 in their surfaces. The webs 33, 33 are brought together and pass between the rolls with their mastic layers in contact. The rolls are so shaped that they exert a pressure which consolidates the two mastic layers into a single core of final form, and the jacket webs conform to the shape of this core. Around their edges the mold cavities 57 have sharp edges which pinch the webs and sever them, so that the molding rolls not only form the single elements but cut the webs around the outlines of each element. The drums 56 thus rotate continuously and uniformly and produce finished elements 58 without interruption to the movement of the webs. Each element includes a body or core of mastic, which is completely encased in a jacket, and by reason of the choice of a two piece jacket, the edges of which meet in a plane without substantial overlap, the rotary forming operation is possible, resulting in a high output rate at low cost.

In Fig. 2, there is illustrated a somewhat more compact form of the apparatus. Here the coated webs 32, 33 pass beneath apparatus 59 for applying grit to the upper web 33, then to apparatus 60 for applying grit to the under surface. The grit is embedded in each coating by the passage of the webs between rolls 51 after which the webs are separated and receive the coating of mastic from supply 52. The coated webs now pass directly to the molding drums 56, and the web 32 is guided thereto by roll 53, while web 33 passes around roll 53', guide roll 54 and a floating roll 61 to the drums. The action of the drums may cause mastic to collect in their bight at 62 if excess above that required is carried by the webs. The roll 61 is therefore mounted to float and if mastic collects at 62 in too great amount, it will lift the roll 61 and be carried with roll 53 back to the supply 52.

In Fig. 10, there is illustrated in side elevation a modified form of the apparatus, involving the use of two groups of rolls 63 and 64, arranged three high. Each group of rolls is supplied with mastic in any convenient manner, for instance, by placing a container for mastic adjacent each group, one side of each container being defined by the rolls. For this purpose, a pair of downwardly diverging partitions 65 may be used as indicated provided with end plates not shown, and holding quantities of mastic 66 in contact with the surfaces of the two lower rolls of each group.

The web 33 is laid between the two upper rolls of the group 63. The middle roll 67 of this group is spaced from the lower roll and is driven at a higher speed than the top and bottom rolls. The roll 67 picks up a layer of mastic from the supply 66 and carries this layer around in contact with the web 33, spreading the mastic on that web under pressure with a wiping action as the roll revolves. The amount of mastic so applied will depend upon the spacing of the middle roll from the top roll and bottom roll. The rolls are journaled in bearings capable of adjustment, so that the thickness of the mastic layer applied to the web can be varied as desired. The coated web passes around the top roll of the group 63 and then around a roll 68 and from there is led directly to the forming rolls 56, or it may pass around cooling rolls 55 as desired.

The web 32 passes around a guide roll 69 and then upwardly between the middle roll and the top roll of the group 64. The rolls of this group are arranged in the same manner and perform the same function as the rolls in the group 63, and, from the top roll of this group, the coated web passes either directly to the forming rolls 56, or to cooling rolls 55. It will be noted that mastic is applied to the under surface of the web 33 and to the upper surface of the web 32 by the pressing and wiping or frictioning action of the rolls 67.

It will be seen that the new product can be produced rapidly according to the process described, and the apparatus required is of simple construction and low cost. Apparatus such as that illustrated in Figs. 1A and 1B will occupy floor space not greatly in excess of 60 feet long and of width not much greater than the units to be produced, whereas standard roofing equipment of the type now generally used is over 100 feet long, and includes numerous expensive parts. Since the present product utilizes unsaturated felt, and the felt is saturated as an incident to other operations, the usual saturating equipment is dispensed with, thus reducing the cost and saving space.

While the new product has been illustrated in the form of a single shingle, it may be produced in the form of strip shingles by using molding drums of appropriate form as illustrated in my co-pending application above referred to. It may also be produced without difficulty in numerous other forms for special purposes.

In Fig. 12, I have illustrated a part of the new element in section and on an enlarged scale. The felt jacket 27 is shown as lying between the mastic 25 on one side and the coating layer 28 on the other and due to the porosity of the felt and its perforation, the asphalt in mastic and coating has united so that the felt is thoroughly impregnated and the core and coating form an integral unit. This effect is increased by the tongues 28' of asphalt which extend through the perforations between the coating and core. Accordingly, the new element in final form includes a core, a jacket completely encasing the core, and a water-proof coating with wear material on the jacket and this product has been produced without starting with a saturated felt and without performing special saturating steps.

The present invention affords numerous advantages over the products, processes, and apparatus heretofore used, among which are the following:

By using unsaturated felt the cost of the final product is cut down and this reduction in cost is an important one, since the felt employed is thin and of light weight. The production cost is also reduced since the material is converted from unsaturated felt to finished shingles in what amounts to a single continuous operation, there being no interruption in the travel of the felt through the apparatus. In the new process, the felt and mastic are at practically the same temperature when acted on by the forming and shaping rolls and since the felt is warm it may be appropriately shaped by these rolls without injury to the felt and without cracking the sealing coating in which the wear material is embedded. This wear material is also firmly affixed to the felt since it passes through two sets of rolls which act upon it and embed it in the sealing coating. The application of the mastic to the felt itself in a layer of regulated thickness insures a uniform supply of mastic to the forming rolls where the core is shaped to final form, and the mastic at the time it reaches these forming rolls has been subjected to a partial compression to eliminate voids so that the final pressing operation results in products of the highest grade. Also, by reason of the use of unsaturated felt, on one face of which mastic is applied, the binder in the mastic is forced into the fibres of the felt and unites with the sealing coating, both the mastic and sealing coating being warm at the time of the final forming operation, and this prevents any separation or delamination of the felt from the core.

The new product is relatively cheap and it may be made in shingles and building products of any shape and form. Shingles made by the new procedure are particularly desirable since they may have the thick butt, so desirable in roofing products, and not obtained with the ordinary commercial roofing. The thickness of the butt does not increase the cost to any substantial extent, since the body of the new shingle is made of a relatively inexpensive mastic and the amount of felt or jacketing material used does not vary substantially whether the products are thick or thin.

While I have described the method of utilizing the unsaturated felt in a product in which the core is completely encased by the jacket, it will be apparent that the same method may also be used to advantage in the production of jacketed elements of other types such as those shown in my Patent No. 1,585,692, issued May 25, 1926.

What I claim is:

1. In a process of producing a material suitable for building and other purposes, the steps of directly applying to one face only of a web of unimpregnated felted fibres a coating of a sealing material, cooling the web and the coating to a preselected temperature adapted to give the coating an initial set, thereafter applying to the other face of the web a coating of regulated thickness of mastic including particles of solid material and a plastic compound in relatively fluent condition, and subjecting the web so treated to compression to bring about substantial impregnation thereof by the plastic material and the coating.

2. In a process of producing a material suitable for building and other purposes, the steps of applying to one face of a web of felted fibres a bituminous sealing coating in relatively fluent condition, applying to the other face of the web a coating of regulated thickness of a mastic including bituminous material, and applying pressure with a wiping action to cause the bituminous material of the coating and the mastic to extend into the felted web a substantial distance and to remove voids in the mastic, thereafter cooling the web and material carried thereby to a temperature at which the coating and mastic are adapted to yield under pressure without cracking, and finally forming and shaping under pressure the resultant product.

3. In a process of producing a product suitable for building and other purposes, the steps of applying to one face of a web of unimpregnated felted fibres a coating of bituminous material in relatively fluent condition, applying to the other face of the web a layer of regulated thickness of relatively fluent mastic including bituminous material, and applying pressure to the opposite faces of the web with a wiping motion to cause the bituminous material of the coating and the mastic to extend into the web and to intimately bond with the fibers thereof and to produce thereon a mastic layer of regulated thickness.

4. In a process of producing a material suitable for building and other purposes, the steps of applying to one face of a web of unimpregnated felted fibres a coating of asphalt in relatively fluent condition, applying to the other face of the web a substantially thicker layer of regulated thickness of a mastic including solid particles and bituminous material similar to that used for the coating, and wiping the bituminous material of the mastic and the coating into the fibers of the web under pressure thereby substantially impregnating the web therewith and displacing any voids among the fibers.

5. A process for making products for building and other purposes, which comprises applying a coating of water-resistant sealing material to one face of each of a pair of webs of felted fibrous material, applying a layer of a mastic to the other face of each web, putting the webs together with their mastic layers in contact and exerting pressure against opposite faces of the webs to unite the mastic layers and mold the webs and the mastic material between them to predetermined shapes.

6. A process for making products for building and other purposes, which comprises applying to one face of each of a pair of webs of felted fibres a sealing coating resistant to weather, applying to the other face of each web a layer of mastic material of substantial thickness, placing the webs with their mastic layers in contact and subjecting the webs to pressure to mold the webs and the mastic material between them to predetermined shapes.

7. A process for making products for building and other purposes, which comprises applying to one face of each of a pair of webs of fibrous material a sealing coating of fusible material in heated condition, applying to the other face of each web a layer of substantial thickness of mastic material including a fusible binding ingredient in heated condition, placing the webs with their mastic layers in contact, and while the coating and mastic is still warm, subjecting the webs to pressure to mold the webs and the mastic material between them to predetermined shapes.

8. A process for making products for building and other purposes, which comprises placing a pair of webs with one face of each in contact, applying a sealing coating to the exposed face of each web, separating the webs, applying to the uncoated face of each web a layer of mastic of substantial thickness, placing the webs with their mastic layers in contact, and subjecting the webs and mastic to pressure applied to compress and form the webs and mastic to predetermined shapes.

9. A process for making products for building and other purposes, which comprises applying to one face of each of a pair of webs of unimpregnated fibrous material a sealing coating in relatively fluent condition, applying to the other face of each web mastic including a relatively fluent ingredient to form a layer of substantial thickness, placing the webs with their mastic layers in contact and subjecting the webs and mastic to pressure to force the coating and fluent ingredient of the mastic into the webs to a substantial distance.

10. A process for making products for building and other purposes, which comprises applying to one face of each of a pair of webs of unimpregnated fibrous material a sealing coating in relatively fluent condition, applying to the other face of each web a mastic which includes a relatively fluent ingredient to form a layer of substantial thickness, subjecting each web thus coated to pressure to force the fluent coating and mastic into the web for a substantial distance, placing the webs with their mastic layers in contact, and subjecting the pair of webs with the mastic between to pressure to consolidate the mastic layers into a single mass and to form this mass and the webs to a predetermined shape.

11. In a process of producing a material suitable for building and other purposes, the steps of perforating a web of fibrous material to roughen one surface thereof, applying to the other surface of the web a coating of material resistant to weather in a relatively fluent condition, applying to the roughened face of the web with a wiping action a layer of substantial regulated thickness of a mastic including a relatively fluent ingredient, and subjecting the coated web to pressure to cause the coating and fluent ingredient to pass through the web and unite therein while controlling the temperature of the web and the material carried thereby during the application of mastic thereto.

12. In a process of producing a material suitable for building and other purposes, the steps of perforating a web of fibrous material to form a multiplicity of openings therethrough and to roughen one surface of the web, applying a sealing coating to the smooth face of the web, this sealing coating being a fusible bituminous product, applying to the roughened surface of the web a layer of substantial regulated thickness of a mastic including a fusible bituminous product in relatively fluent condition, and subjecting the coated web to pressure to force the coating material and the bituminous ingredient of the mastic through the openings in the web.

13. A process for making products for building and other purposes, which comprises placing a pair of webs with one face of each in contact and applying to the exposed face of each web a sealing coating of bituminous material in relatively fluent condition, separating the webs and applying to the uncoated face of each a layer of substantial thickness of a mastic including a bituminous ingredient in relatively fluent condition, cooling the webs with their coatings to give the sealing coating and mastic an initial set, thereafter placing the webs with their mastic layers in contact, and subjecting the webs and the mastic between them to pressure to consolidate the mastic layers into a single mass and to shape the webs and said mass to a predetermined form.

14. A process for making products for building and other purposes, which comprises applying to one face of each of a pair of webs of unimpregnated fibrous material a sealing coating in relatively fluent condition, depositing granular material over the coated surfaces of the web, and subjecting each web to pressure to cause the granular material to be partially submerged in the coating over which it is applied, applying to the other face of each web a quantity of mastic, including a relatively fluent ingredient to form a layer of substantial regulated thickness, placing the webs with their mastic layers in contact, and subjecting the web with the mastic between them to pressure to force the coating and fluent ingredient of the mastic into the webs.

15. A process for making products for building and other purposes, which comprises applying sealing material to one face of each of a pair of webs of felted fibrous material, applying a layer of mastic in regulated thickness to the other face of each web, placing the webs with their mastic layers in contact and exerting pressure against opposite faces of the webs to unite the mastic layers.

16. A process for making products for building and other purposes, which comprises applying to one face of each of a pair of webs of fibrous material a sealing coating of bituminous material in heated condition, applying to the other face of each web by means of pressure and with a wiping motion a layer of substantial thickness of mastic material including a fusible binding ingredient in heated condition, cooling the webs and materials carried thereby, placing the cooled webs with their mastic layers in contact and, while the coating and mastic is still warm, subjecting the webs to pressure to mold the webs and the mastic material between them to a predetermined shape.

17. A process for making products for building and other purposes, which comprises placing a pair of perforated webs with one face of each in contact, applying a sealing coating to the exposed face of each web, separating the webs, applying to the uncoated face of each web a layer of mastic of substantial thickness by means of a wiping movement applied under pressure, thereby forcing the mastic into intimate contact with the fibers of the web and through the perforations into intimate contact with the sealing coating on the opposite side thereof, placing the thus-treated webs with their mastic layers in contact, and subjecting the webs and mastic to pressure sufficient to compress and form the webs and mastic to predetermined shape and size.

18. A continuous process for making products for building and other purposes, which comprises continuously moving a pair of webs along a predetermined path, and during such movement bringing the said webs together with a face of each in contact along a portion of their path of travel, applying a sealing coating to the exposed face of each of the webs, thereafter separating the webs, applying to the uncoated face of each web a layer of mastic of substantial thickness, placing the webs with their mastic layers in contact and, while the coating and mastic is warm subjecting the webs and mastic to pressure adapted to compress and form the webs and mastic into a product of predetermined shape.

19. A continuous process for making products for building and other purposes, which comprises continuously moving a number of webs of fibrous material along a predetermined path, perforating the respective webs during such movement to form a multiplicity of fine openings therein and to roughen one surface of each web, subsequently bringing the said webs together with the respective perforated faces in mutual contact during a portion of their path of travel, while applying a sealing surface coating of a fluent bituminous material to the exposed face of each web, thereafter separating the webs and applying to the uncoated surface of each web a layer of substantial regulated thickness of a mastic including a fusible bituminous material in relatively fluent condition, placing the webs with their mastic layers in contact, and subjecting the webs and mastic to pressure while forming the webs and mastic into a product of preselected shape.

20. A continuous process for making products for building and other purposes, which comprises continuously moving a number of webs of fibrous material along a predetermined path, perforating the respective webs during such movement to form a multiplicity of fine openings therein and to roughen one surface of each web, subsequently bringing the said webs together with the respective perforated faces in contact during a portion of their path of travel, while applying a sealing surface coating of a fluent bituminous material to the exposed face of each web, thereafter separating the webs and applying to the uncoated surface of each web a layer of substantial regulated thickness of a mastic including a fusible bituminous material in relatively fluent condition, placing the webs with their mastic layers in contact with each other, and, while the coating and mastic is warm, subjecting the webs and mastic to pressure, thereby forcing the coating material and mastic into intimate contact through the openings in the web and compressing and forming the webs and mastic into a product of preselected shape.

21. The process for making products for building and other purposes, which comprises applying to one face of each of a pair of webs of unimpregnated fibrous material a sealing coating of a relatively fluent waterproofing material, removing from a source of supply a mastic which includes a relatively fluid ingredient and applying a layer of the mastic of substantial regulated thickness to the other face of each web, intermittently automatically returning excess mastic to the said source of supply, placing the webs with their mastic layers together to form a composite structure, and subjecting the said structure to pressure, to force the fluent coating and mastic into mutual contact within the web, while consolidating the mastic layers to form a product of preselected shape.

22. The process for making products for building and other purposes, which comprises applying to one face of each of a number of webs of unimpregnated fibrous material, a sealing coating of fluent bituminous material, applying to each of the said coated faces a surface layer of solid wear-resistant material, thereafter applying to the other face of each web a mastic which includes a less fluent bituminous ingredient thereby forming a mastic layer of substantial regulated thickness, while subjecting each web thus coated to pressure to force the fluent coating and mastic into mutual contact within the web, placing the webs with their mastic layers together, and subjecting the pair of webs and mastic to pressure to consolidate the mastic layers into a unitary mass of preselected shape.

23. The process for making products for building and other purposes, which comprises applying to one face of each of a number of webs of unimpregnated fibrous material, a sealing coating of fluent bituminous material, applying to each of the said coated faces a surface layer of solid wear-resistant material, withdrawing a mastic which includes a less fluent bituminous ingredient from a body thereof and frictionally applying the said mastic to the other face of each web to form thereon a layer of mastic of regulated thickness while automatically returning excess mastic to the said body, thereby forcing the fluent coating and mastic into mutual contact within the web, placing the webs with their mastic layers in contact, and applying pressure to the webs to consolidate the mastic layers and to form a composite structure of preselected shape.

In testimony whereof I affix my signature.

THOMAS ROBINSON.